United States Patent Office 3,108,446
Patented Oct. 29, 1963

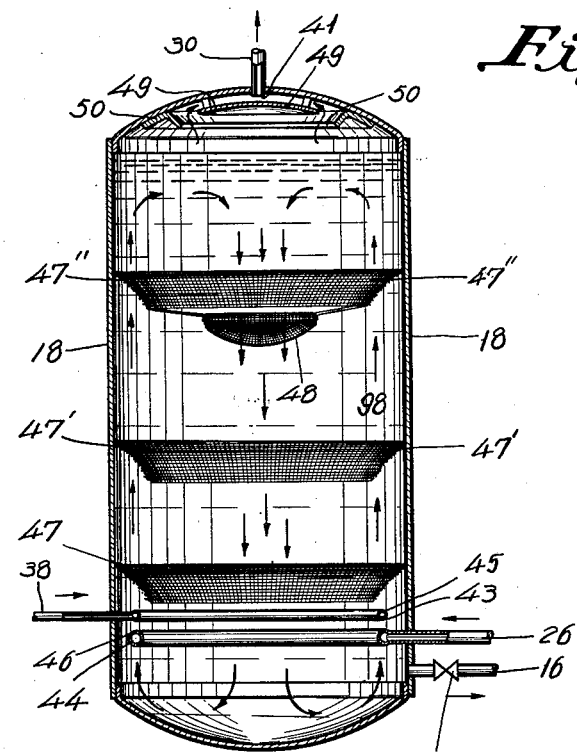
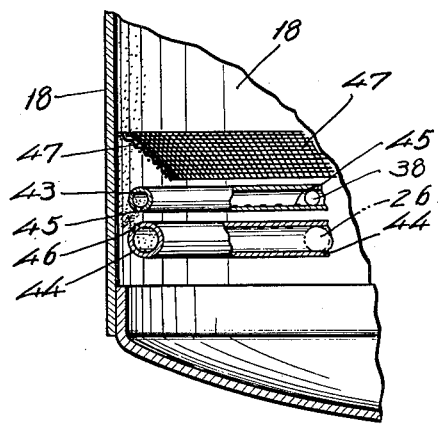

3,108,446
CONTAINER VESSEL ARRANGEMENT FOR STORAGE AND TRANSPORTATION OF LIQUEFIED NATURAL GASES
Yoshitoshi Sohda and Yoshimi Sohda, Tokyo-to, Japan; said Yoshimi Sohda assignor to said Yoshitoshi Sohda
Filed Dec. 12, 1960, Ser. No. 75,347
Claims priority, application Japan Dec. 21, 1959
9 Claims. (Cl. 62—54)

The present invention relates to a container vessel assembly for the storage and transportation of liquefied natural and other similar gases. The liquefied gases referred to herein are those containing a substantial amount of liquefied methane or similar liquefied gases such as liquefied ethane, propane and the like, having a boiling point at normal pressure, ranging from $-160$ to $-170°$ C.

Generally speaking, liquefied natural gases are stored in container vessels which are not specially constructed as pressure vessels, but are designed to have enough strength to be capable of withstanding atmospheric pressure so that it is easy to remove the evaporated gases therefrom, the outside surfaces of said vessels being covered with heat insulating materials in order to insulate the vessels to prevent the outside atmospheric heat from adversely affecting the cooled inner spaces of said vessels. The heat insulators thus provided are further covered with suitable mechanical protecting materials. These insulating and protecting materials do not, however, constitute any part of the present invention, so that suitably selected conventional means may be used for these purposes.

A heat exchanger vessel, which constitutes, as will be described hereinafter, an important constituent of the novel assembly, as well as the necessary piping systems attached to said heat exchanger vessel and to the storage vessel may also be fitted with similar insulating and mechanically strengthening means such as are conventional in refrigerating systems. For this reason, these insulating and strengthening means have been omitted from the graphical representations in the accompanying drawings and from the disclosure as set forth hereinafter.

Liquefied natural gases contain generally more than 90% methane by volume. An example of the composition of such natural gases is: methane 99.2%; nitrogen 0.6%; and carbon dioxide 0.2%. Other combustible gases, such as ethane, propane, butane and the like are usually not present. It will be clear from the foregoing, that liquefied natural gases contained in a container vessel are usually not explosive in themselves. It may be feared, however, that any natural gases which leak out of either the container vessel or the pipes and fittings connected thereto, may invite either fire explosions caused by an outside source of fire, or explosions induced by outside conditions, so that extreme care should be taken to prevent possible explosion of the stored liquefied natural gases. The range of explosive concentration of methane, for instance, in the air is 4.9–15.0% by volume. If gaseous methane mixes with air within said concentration range, the possibility of explosion will arise due to such causes as sparks, bare flames and the like, which, if it should happen, could result in considerable damages and losses.

When liquefied natural gases contained in one or more container vessels are stored or transported under normal or substantially normal pressure and kept at an extraordinary low temperatures, the contents will absorb a quantity of heat from the outside atmosphere and a small part of the stored liquid will thereby be evaporated into gases, even when the outside surfaces of the vessel have been most carefully covered with efficient insulating material. It has been a common practice, in order to handle this relatively small quantity of evaporated natural gases, mainly consisting of methane, to re-liquefy them by means of a compressor fitted to the vessel, and returning them to the interior thereof. By such compressing, re-liquefying and returning, loss of the evaporated natural gases can be substantially avoided. Since, according to the above mentioned conventional process, the evaporated gases are re-liquefied and re-circulated by a compressor, care should be taken to substantially completely obviate possible explosion of gases leaked from the compressor and associated equipment. For this purpose, a considerable amount of additional equipment is necessary, and considerable difficulties and troubles arise during the course of operation of the container plant.

It is therefore the main object of the invention to provide a novel and efficient container vessel of the kind above referred to, which substantially completely obviates the possible risk of fire or explosion.

Another object of the invention is to provide a container vessel of the kind above referred to, wherein the stored liquid is kept at a satisfactory low temperature by substantially preventing heat absorption by the vessel body, thus keeping the quantity of evaporating natural gases to a minimum.

Another object is to provide a container vessel of the kind above referred to, wherein the small quantity of evaporated natural gases which nevertheless unavoidably evaporates from the corresponding liquid phase contained therein is taken out therefrom, fractionated to liquid and returned back to said vessel in an easy and simple way.

Still another object of the invention is to provide a container vessel of the kind above referred to, which is highly efficient in use when stationary, or for use in the transportation of liquefied natural gases on board a ship or flying vessel, or either by rail or by road.

As already mentioned hereinbefore, liquefied natural gases comprise substantially all methane, so that it can be assumed for the purpose of the disclosure of the present invention that these gases consist of methane only. It should therefore be expressly understood that "methane" as set forth hereinafter means a representative natural or similar gas, to which the invention pertains.

In the novel apparatus according to the invention, a heat exchanger or an auxiliary vessel is provided, in addition to a main storage vessel for storing the liquefied methane, for producing supercooled liquid methane. At a controlled rate, part of the stored liquid methane having a temperature between $-162°$ C. and $-165°$ C. is taken out of the interior of the main storage vessel at a suitable zone in the neighborhood of the shell wall thereof and below the free surface of the stored liquid methane and then injected into the auxiliary vessel in the proximity of the bottom thereof through a first injection coil. In addition to the said first injection coil, a second injection coil is provided in the auxiliary vessel in close proximity to the first injection coil, for injecting liquefied nitrogen having a temperature of, say, about $-195.8°$ C., which is prepared and supplied separately. In this way, the injected liquid methane and liquid nitrogen are caused to contact each other intimately, thus effecting an efficient heat exchange to produce the desired supercooled liquid methane having a temperature between about $-180°$ C. and about $-182°$ C. The thus supercooled methane is injected by a pressure pump into the storage vessel at the center of the bottom thereof for re-circulation, the body of stored liquid methane thereby being kept at a temperature between $-162°$ C. and $-163°$ C.

On the other hand, the liquefied nitrogen supplied to the heat exchanger or auxiliary vessel is gasified during the aforementioned heat exchange with the injected liquid methane and is then conducted from top of the auxiliary vessel into the space above the free surface of the liquid methane contained in the main storage vessel to fill said space. In a preferred embodiment of the invention, the storage vessel has a fractionating or condensing chamber on the top thereof, which chamber has a plurality of fractionating or condensing elements arranged in stages therein. In this embodiment, the gasified nitrogen conducted to the space above the free surface of the liquid methane in the main storage vessel passes upwardly through the fractionating chamber and a small quantity of the entrained gaseous methane, if any, is separated by condensation. The gaseous nitrogen thus substantially free of methane is then drawn out of the fractionating chamber by a multistage compressor and compressed therein and then cooled in a heat exchanger to its liquid phase. The thus liquefied nitrogen is then re-circulated for continuous heat exchange with liquid methane in the auxiliary vessel. The arrangement may, however, dispense with the fractionating or condensing chamber. In this case, the multistage compressor draws the gaseous nitrogen directly from top of the main vessel.

The above and further objects and novel features of the present invention will more fully appear from the following detailed description when the same is read in connection with accompanying drawings. It is to be expressly understood, however, that the drawings are for the purpose of illustration only and the invention is limited only by the claims.

In the drawings,

FIGURE 2 is an enlarged sectional view of the heat exchanger vessel shown in FIGURE 1;

FIGURE 3 is an enlarged fragmental sectional view of the lower left-hand corner of the heat exchanger vessel shown in FIGURE 2;

Figure 1:
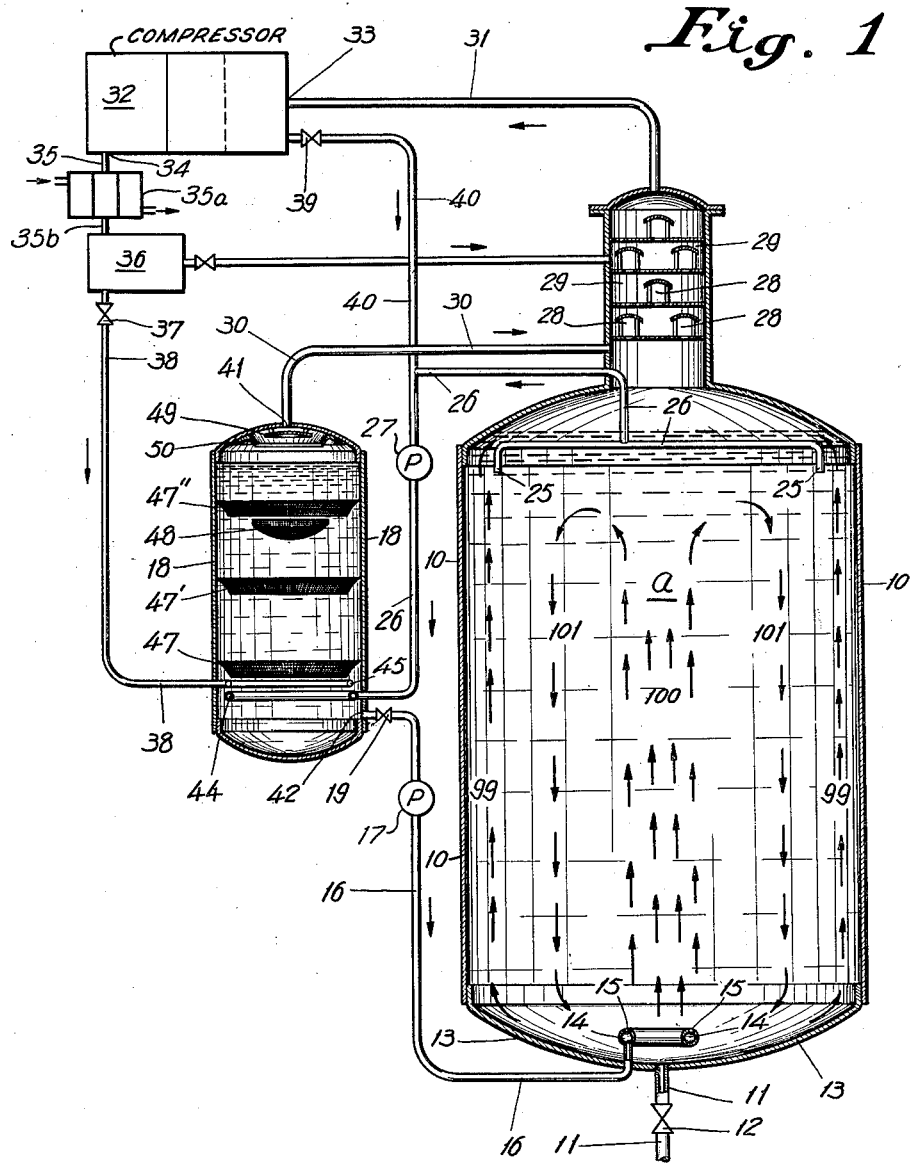
FIGURE 1 is a somewhat diagrammatic representation of a first embodiment of the invention wherein a storage vessel proper, a rectifying or condensing chamber attached thereto, a liquefied natural gas injection coil and a heat exchanger vessel connected therewith are shown in section.
Figure 5:
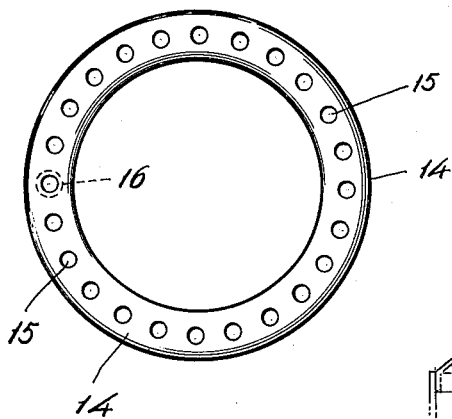
FIGURE 5 is an enlarged top plan view of the injection coil means shown in FIGURES 1 and 4.
Figure 6:
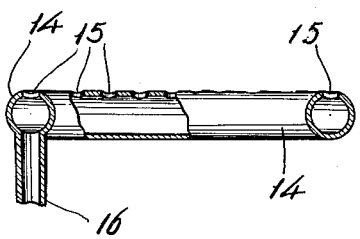
FIGURE 6 is a cross-sectional view, partially cut away, of the injection coil means shown in FIGURE 5.

Referring to the accompanying drawings, especially FIGURE 1 thereof a storage vessel 10 of chemically resistant material such as, for instance, stainless steel, contains a body of liquefied methane denoted by reference character $a$. The vessel 10 has in the central portion of the bottom wall 13 a dual purpose pipe 11 which serves as an inlet and an outlet, as the case may be, for methane, said pipe being fitted for this purpose with a closable cock or valve means 12. Within the vessel 10 and in the proximity of the bottom wall is mounted an injection coil 14 which is horizontal and which is in the shape of a circular ring. This ring is for injecting supercooled, liquefied methane for cooling the body of liquid stored in the vessel 10. For this purpose, the injection coil 14 has in its upper peripheral wall, as clearly shown in FIGURES 5 and 6, a number of spaced injection orifices 15 which are directed upwardly of the coil. Coil 14 is connected to a supply pipe 16 connected to a pressure pump 17 for supplying supercooled liquefied methane. The pump 17 is connected through a control valve 19 to the lower portion of a heat exchanger vessel 18. The heat exchanger vessel, as will be described more in detail hereinafter, produces supercooled, liquefied methane having a temperature ranging from —180 to 181° C. It will thus be clear from the foregoing, that the pressure pump can be operated to deliver a controlled rate of supercooled, liquefied methane having a specified temperature to the injection coil 14 and the liquefied gas will flow through the said orifices 15 in the vicinity of the center of the bottom portion of the vessel 10 into the body of stored liquid.

Figure 4:
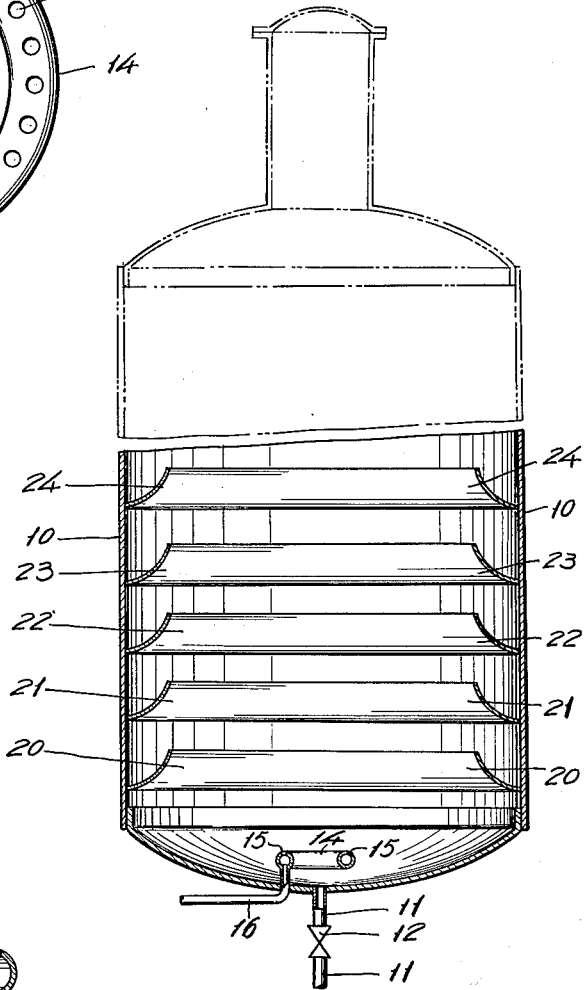
FIGURE 4 is a fragmentary sectional detail view of the storage vessel shown in FIGURE 1, showing the lower part thereof in full lines and showing the injection coil means arranged at the bottom of the vessel.

Generally speaking, and as is commonly known to those skilled in the art, a relatively lower thermal surface conductivity exists when fluid contained in a vessel is stationary than when the fluid is moving. Thus, with stationary fluid in a vessel, there is normally a considerable difference in temperature between the inside surface of the container vessel wall and the fluid per se. Because of these considerations, the arrangement according to the present invention is preferably such that the supercooled, liquefied methane supplied at the bottom of the storage vessel 10 is injected by the injection coil 14 positioned at the central portion of the vessel so that a number of injected streams of liquefied methane are directed from the center of the bottom of the vessel in the upward direction, so that the central portion of the stored body of the liquid is urged to flow upwardly toward the surface of the liquid surface. The upwardly flowing central portion of the stored liquid is then caused to flow radially, and then downwardly in the vicinity of the wall of the container vessel due to convection, thus producing continuous recirculation. This recirculating process is clearly shown by small arrows 100 and 101 in FIGURE 1, illustrating the thus established convection flow pattern within the vessel 10. Additionally, small arrows 99 along the inside surface of the wall of the vessel 10 illustrate upwardly directing flow currents flowing along the wall. These last mentioned currents, however, have a strong tendency to entangle with the oppositely or downwardly flowing convection currents, so that a number of small localized swirls are established. This phenomenon effectively prevents establishment and maintenance of free upward currents directly along the inside surface of the container wall, which fact favorably affects the desired maintenance of a considerable temperature drop between the inside surface of the wall of the storage vessel and the body of the liquid contained therein. If necessary, a plurality of inwardly and upwardly directing deflector rings 20, 21, 22, 23, 24 . . ., clearly illustrated in FIGURE 4, may be provided in vertically spaced stages on the inside surface of the wall of the vessel so as to deflect the upwardly flowing currents in close proximity to the wall inwardly towards the downwardly flowing convection currents, thereby effectively impeding the upwardly flowing currents and tending to approach the desired stationary conditions.

As clearly illustrated in FIGURE 1, a horizontal suction pipe 26 is positioned somewhat below the free surface of the liquid body in the storage vessel, the opposite ends of the suction pipe serving as suction inlets 25 and being positioned close to the wall of the vessel. The suction pipe leads to a suction pump 27 which in turn is connected to the heat exchanger vessel 18 near the bottom thereof. This pumping arrangement is operated to transfer liquefied methane contained in the storage vessel and having a temperature between about —162 and — 165° C. at a controlled rate from directly below the liquid surface in the storage vessel and in the vicinity of the wall to the heat exchanger vessel through the suction pipe. The purpose of this transfer will be explained in detail hereinafter.

An upper neck-like chamber integral with the top of storage vessel 10 forms a rectifying or condensing chamber 29, in which are fitted a plurality of fractionating or condensing elements 28 in several vertical stages. A gaseous nitrogen riser 30 connects the space below the lowermost fractionating or condensing stage in the rectifying chamber with the top of the heat exchanger vessel 18. This riser serves, as will be described more in detail hereinafter, for feeding gaseous nitrogen from the heat exchanger vessel to the rectifying chamber, for the purpose of separating and returning a small quantity of vaporized methane entrained by the nitrogen gas back to the storage vessel, as will also be described hereinafter more in detail.

A pipe 31 connects the top of the fractionating chamber 29 to the suction inlet 33 of a multistage compressor 32. The delivery side 34 of the compressor is connected by a pipe 35 to a heat exchanger 35a for liquefying the compressed nitrogen from compressor 35, and a pipe 35b connects heat exchanger 35a to a liquid reservoir 36 for accumulating liquefied nitrogen at a temperature of about −195.8° C. From the liquid receiver 36 a liquefied nitrogen supply pipe 38 extends to the heat exchanger vessel 18 and is connected to a suitable place in the vicinity of the bottom thereof. Through this system nitrogen is continuously recirculated and serves as the primary cooling medium. For control of the supply quantity of liquefied nitrogen to the said heat exchanger, the supply pipe 38 has valve means 37 therein. A discharge pipe 40 extends from a suitable stage of the compressor 32 to the liquefied methane suction pipe 26 and has a control valve 39 therein. This discharge pipe 40 serves for discharging liquefied methane separated from the nitrogen in the compressor to the suction pipe. The thus discharged liquefied methane, if any, will be supplied to the heat exchanger vessel 18, together with the liquid drawn from the upper part of the stored body of liquefied methane within the storage vessel 10.

The construction and function of the heat exchanger vessel 18 will now be described in detail hereinbelow, especially with reference to FIGURES 2-3:

The vessel 18 has an outlet opening 41 at the top from which the already described gaseous nitrogen riser 30 extends. In the lower part of the wall of the vessel is an outlet opening 42 for supercooled liquified methane, to which outlet the liquid supply pipe 16 is connected. As seen in FIGURES 2 and 3, injection coils 43 and 44 are positioned near the bottom of the vessel 18 one above the other, each of the said coils being in the shape of a circular ring. The upper coil 43 is for the injection of liquefied nitrogen, and has a number of spaced injection orifices 45 in the wall thereof directed downwardly and outwardly of the ring for directing the injected liquid nitrogen towards the shell wall, the liquid having a temperature of about −195.8° C. as it is delivered from receiver 36. On the other hand, the lower coil 44 is for the injection of liquefied methane and has a plurality of spaced injection orifices 46 in the wall thereof directed upwardly and outwardly substantially in opposition to the orifices 45 in ring 43, the number of orifices 46 being equal to the number of orifices 45. The second group of injection orifices 46 also directs the injected liquefied methane which has a temperature between −162 and −165° C., towards the shell wall. It will be noted from the foregoing, that both injected liquids are thus brought into collision with each other, so that the injected jet streams are divided into fine particles and intermingled with each other intimately. Under these conditions the particles will rise along the inside surface of the vessel wall towards the free surface of liquefied methane in the vessel.

As is also seen from FIGURES 2 and 3, a plurality of wire nets or divider screens 47, 47', 47" . . . made from fine alloy steel wires are mounted at vertically spaced positions along the inside surface of the wall of the heat exchanger vessel so that they cover the circular cylindrical space above the injection coils 43—44. By means of these screens, the liquefied nitrogen and liquefied methane injected into the vessel, as well as the bubbles of gasified gaseous nitrogen developed in the vessel and having a low temperature ranging from about −165° C. to −195° C. are divided into fine particles and bubbles by collision against and passage through these fine screens, in order to carry out the desired effective heat exchange between the nitrogen and methane by increasing the contact surfaces of each medium.

As is further seen from the diagrammatic representation in FIGURE 2, a substantially horizontal curved screen 48, preferably also made of fine alloy steel wires, is positioned somewhat below the free surface of the liquid within the heat exchanger vessel and in the central region thereof. The purpose of providing this curved screen 48 is so that if solidified methane should form due to partial supercooling of the liquefied methane, the solids are caught by this screen and then again liquefied under the influence of downwardly flowing currents of liquefied methane which exist in the center portion of the vessel, the said currents having a temperature ranging from about −162° to about −165° C. As is known to those skilled in the art, nitrogen boils at −195.8° C., while methane has a melting point of −182.7° C. and a boiling point of −161.5° C. When liquefied methane solidifies, a definite quantity of latent heat, 14.53 kcal./kg., must be taken up by the neighboring liquid. It will thus be clear, that if the liquefied methane is temporarily cooled to the above mentioned temperature of −182.7° C., it can not solidify instantly. If some of the liquid methane is solidified, these solid particles are caught by the curved screen 48, so that they are prevented from mixing with and being distributed throughout the supercooled liquid methane in the vessel 18 for very long.

The heat exchanger vessel 18 is provided with liquid separating means, which preferably comprises an inverted dish 49 positioned directly below the center of the top of the vessel, and a ring plate 50 having a downwardly and inwardly extending portion and arranged somewhat below and in spaced relation with the peripheral edge of the dish 49. This separating means serves effectively to prevent methane droplets, which may develop at the very instant of evaporation of liquid nitrogen and be entrained by the thus developed gaseous nitrogen, from reaching the outlet opening 41 formed in the top center portion of the vessel 18. Liquid nitrogen supplied to the vessel 18 and caused therein to collide strongly with a large quantity of liquid methane supplied from the container vessel 10 and having a temperature between about −162° C. and −165° C., is automatically divided into fine droplets and then evaporated rapidly and actively. The thus evaporated gaseous nitrogen frequently carries along a considerable quantity of liquid methane from the free surface of the liquid methane in the vessel in finely divided droplets. The provision of the separating means will effectively prevent these droplets from passing out through the outlet opening 41 together with the outgoing gaseous nitrogen.

The operation of the apparatus will now be described in detail hereinunder, first with respect to the flow of the nitrogen:

The gaseous nitrogen sucked from top of the storage vessel 10 at about −168° C. to −175° C. by the multistage compressor 32 is compressed to its liquid state, cooled in heat exchanger 35a, and then discharged into the liquid receiver 36. Should there be a small quantity of methane in the form of gas or fine droplets occasionally entrained by the gaseous nitrogen, it is liquefied in the first stage of the compressor. Opening the valve means 39 permits the liquefied methane to be delivered through the pump 27 into the heat exchanger vessel 18.

The liquid nitrogen accumulated in the receiver 36 is, on the other hand, delivered at a controlled rate into the vessel 18 by suitably adjusting valve means 37. The thus supplied liquid nitrogen, which has a temperature of −195.8° C., is intimately mixed in the already described manner with the liquid methane supplied by the pump 27 at temperatures ranging from about −162° C. to −165° C. from the upper part of body of the liquid methane stored in the storage vessel 10. The nitrogen evaporates within the auxiliary vessel 18. The thus developed gaseous nitrogen, having a temperature between about −180° C. and −182° C., is led through the circular gap between dished and ring-shaped baffles 49 and 50 and discharged into the space below the lowermost stage of the fractionating or condensing elements 28 in the rectifying chamber 29.

The gaseous nitrogen supplied to the rectifying chamber 29 cools the gaseous nitrogen in the space above the liquid surface within the main vessel 10 and it is then drawn into the compressor 32 after passing through the several stages of the fractionating elements 28. Methane contained in its gaseous or liquid particle form in the gaseous nitrogen is caught by these fractionating or condensing elements and dissolved in the liquid methane contained therein, while the gaseous nitrogen, now substantially free of methane, is drawn in substantially its pure state from top of the chamber 29. In the course of the above mentioned cooling and separating process, the gaseous nitrogen supplied from the auxiliary vessel 18 into the main vessel 10 is reduced in its temperature to a temperature between −168° C. and −175° C. when it leaves the rectifying chamber 29.

The cooling process carried out within the main vessel 10 will now be more fully described:

The liquid methane contained in the storage vessel is kept at a temperature substantially between −162° C. and −163° C., as described hereinbefore. The liquid is taken out of the peripheral part of the stored body of liquid near the free surface of the liquid. For the proper quantity of liquid taken out, reference is made to a numerical example given hereinafter. The liquid withdrawn is delivered by the pump 27 into the auxiliary vessel 18 near the bottom of vessel 18 through the injection coil 44 and the orifices 46 formed therein in the manner described above. The temperature of the thus supplied liquid is between −162° C. and −163° C. The upwardly and outwardly injected liquid methane is intimately mixed with the downwardly and outwardly directed jet streams of nitrogen from the orifice 45 formed in the second injection coil 43, thus being divided into fine particles. The thus formed fine liquid particles are further divided by contact with and by passage through the several divider screens 47, 47′, 47″ . . . . The finely divided liquid particles of nitrogen pick up enough heat from the neighboring liquid methane in the auxiliary vessel to evaporate and to form fine gas bubbles, which rise up to the surface of the liquid forming upwardly flowing currents near the inside surface of the wall of the heat exchanger vessel 18, as diagrammatically illustrated by a plurality of upwardly directed small arrows 98 in FIGURE 2.

When the liquid nitrogen is gasified in the above mentioned manner, it deprives the neighboring liquid methane of the latent heat of evaporation, 48.5 kcal. per kg. and the temperature of the gas is further elevated to a level substantially equal to that of the liquid methane by continuing heat exchange. The thus developed gas bubbles of nitrogen will emerge from the free surface of liquid methane, causing splashes to take place to a more or less degree. The gaseous nitrogen is delivered through the riser 30 into the fractionating chamber 29.

In the course of the heat exchange process just described, the liquid methane injected through orifices 46 in the lower or second injection coil 44 at a temperature between about −162° C. and −163° C. is cooled by the injected nitrogen and has its temperature lowered to a temperature substantially equal to that of the gasified nitrogen. The temperature of the cooled liquid methane in the numerical example set forth hereinbelow will be −181° C. Methane kept at such a temperature is referred to herein as "supercooled liquid methane." More specifically, and as will be demonstrated in the following example, when 100 volumetric parts of liquid methane at −163° C. are intimately mixed with 11 volumetric parts of liquid nitrogen at −195.8° C., they will have a common final temperature of −181° C.

As known to those skilled in the art, liquid methane boils at −161.5° C. and solidified methane melts at −182.7° C., while the corresponding critical points of nitrogen are −195.8° C. and −209.8° C., respectively. It will thus be expected that when liquid methane having temperatures between −162° C. and −163° C. is brought into contact with liquid nitrogen, part of the methane will solidify into small flakes. However, in the present case, both substances are divided into fine bubbles and liquid particles, respectively, and, as already mentioned, are caused to collide with each other at high speeds in the form of jet streams for effecting efficient heat exchange. Moreover, the quantity of liquid methane is selected in this case so as to be at least nine times that of the liquid nitrogen. Thus the quantity of latent heat necessary for the solidification of the methane is considerable, so that the formation of the flakes of solidified methane is kept to a minimum. The solidified methane, if any, is then carried by the peripheral upward streams and reaches the free surface of the liquid within the auxiliary vessel. These flakes are then carried along by the central downward currents and caught by the fine mesh screen 48. The said flakes are there liquefied again after a short time by heat exchange with the downward currents having a relatively large volume or flow rate.

The thus obtained supercooled liquid methane having a temperature between about −180° C. and about −181° C. is pumped at a controlled rate by the pressure pump 17 into the bottom of storage vessel 10, thus producing central upward currents, as shown by a number of small upwardly directed arrows 100. These currents are deflected radially when they rise up to and in the neighborhood of the free surface of the body of liquid stored in the main vessel, and then flow downwardly in a cylindrical flow parallel to and near the inside surface of the storage vessel wall, as shown by a plurality of downwardly directed small arrows 101, thus establishing relatively slow convectional currents.

It will be clear from the foregoing, that by properly adjusting the quantity as well as the temperature of the supercooled liquid methane supplied to the storage vessel 10, the quantity of heat transmitted from the outside atmosphere through the vessel wall into the body of the liquid methane stored in the vessel can be effectively balanced out by the above mentioned injected supercooled liquid methane so as to keep the whole body of the stored liquid at a temperature between −162° C. and −163° C., thus accomplishing the desired cooled storage thereof.

The above mentioned operation will be now explained hereinbelow more in detail with reference to the following numerical examples:

Assuming that the quantity of liquid methane in the stored body, the evaporative loss of which is to be obviated, is 1000 kgs. and 1000 liters, respectively, and further that the quantity of liquid methane stored and transported in the conventional way which evaporates per day amounts to 0.25% of the stored liquid, the specific numerical values will be:

|  | In the case of— | |
| --- | --- | --- |
|  | 1,000 kgs. | 1,000 liters |
| Quantity of evaporating liquid methane: | Kgs. | Liters |
| Per 24 hours | 2.5 | 2.5 |
| Per hour | 0.104 | 0.104 |

As is known, the latent heat of evaporation of liquid methane is 121.9 kcal./kg., and the hourly heat consumption for the evaporation will be: 121.9×0.104=12.6 kcal./hr. The quantity of heat to elevate 1 kg. of the aforementioned supercooled liquid methane in temperature to −183° C. is:

$$0.534 \times (181-163) = 9.612 \text{ kcal./kg.}$$

wherein, 0.534 kcal./kg. is the specific heat of liquid methane. Thus, the evaporative loss of the supercooled liquid methane amounts to:

| In the case of— | |
|---|---|
| 1,000 kgs. | 1,000 liters |
| $\frac{12.6}{9.612} = 1.31$ kgs./hr. or 3.1 liter/hr. | 554 grs./hr. or 1.31 liter/hr. |
| If calculated on a per minute base | |
| 21.8 grs./min. or 51.8 cc./min. | 9.23 grs./min. 21.9 cc./min. |
| If calculated on a per second base | |
| 0.365 gr./sec. 0.863 cc./sec. | 0.154 gr./sec. 0.365 cc./sec. |

On the other hand, the quantity of heat required for elevating the temperature of nitrogen from −195.8° C. to −181° C. is:

$$0.13 \times (195.8-181) + 45.8 = 47.724 \text{ kcal./kg.}$$

wherein, 0.13 kcal./kg. is the specific heat of gaseous nitrogen and 45.8 kcal./kg. is the latent heat of evaporation of liquid nitrogen. The consumption rate of nitrogen to obviate the above mentioned evaporation of liquid methane is:

$$\frac{12.6}{47.724} = 0.264 \text{ kg./hr.}$$

Thus, the following table can be obtained:

| In the case of— | |
|---|---|
| 1,000 kgs. of methane | 1,000 liters of methane |
| hourly: 264 grs./hr. 327 cc./hr. per min.: 4.4 grs./min. 5.45 cc./min. per sec.: 0.073 gr./sec. 0.09 cc./sec. | 112 grs./hr. 138 cc./hr. 1.87 grs./min. 2.30 cc./min. 0.0312 gr./sec. 0.038 cc./sec. |

The necessary quantity of liquid nitrogen relative to 1.31 kgs. (3.1 liters) of supercooled liquid methane will amount to 0.264 kg. (or 327 cc.). The ratio will then be:

By weight:

$$\frac{264}{1310} = 19.4\%$$

By volume:

$$\frac{327}{3100} = 10.5\%$$

Thus, according to the invention, the following main advantages are obtained.

(1) Since the body of liquid methane stored in the main vessel is always kept at a lower temperature than its boiling point −161.5° C., say, from −162° C. to −163° C., or if desired still lower, disadvantageous evaporation of the stored liquid methane can be effectively prevented.

(2) The substantial part of the liquid methane stored in the main vessel is surrounded by convectional flows of −165 to −181° C., so that a local temperature rise of the stored liquid body can not take place.

(3) In the course of producing supercooled liquid methane, the heat exchange is carried into effect through direct contact by utilizing a large contacting surface, instead of by an indirect method employing heat transfer walls, so that the highest possible efficiency in this respect can be attained.

(4) The flow of liquid methane, which should be handled with maximum care, is relatively short, which is naturally a highly favorable advantage.

(5) Should the contents leak out from either the main vessel or the auxiliary vessel, inflammable nitrogen only would come out first, so that safety against fire accidents can be effectively assured.

(6) Even when the leak continues, enough time allowance is given for taking effective counter measures to prevent possible fire hazard, because, according to the invention, the stored body of liquefied methane in the main vessel is kept at a considerably lower temperature than in the case of a conventional arrangement wherein the methane is stored substantially at its boiling point, so that in the former the issuance of the gaseous methane from the main vessel requires a considerably longer time interval from the initiation of the leak.

Although only a specific embodiment of the invention is herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. In a container vessel arrangement for storage and transportation of liquefied natural and other similar gases in the cooled condition, the combination of a storage vessel for reception therein of a body of said liquefied gases; a heat exchanger vessel provided separately from said storage vessel and having therein liquid nitrogen injecting means and liquefied gas injecting means for production of supercooled liquefied natural gases through heat exchange; a first pressure pump connected at its suction side with said heat exchanger vessel for drawing said supercooled liquefied natural gases therefrom, a supercooled liquefied natural gas injection means provided in the vicinity of the bottom of said storage vessel to which the pressure side of said pump is connected; a multistage compressor connected with the top of said storage vessel for sucking gases in the upper space thereof; a piping in said storage vessel arranged below the free surface of the liquid body contained therein and having a plurality of inlet openings arranged in the vicinity of the inside of the wall of said storage vessel; a second pressure pump connected at its suction side with said piping; and a liquid nitrogen reservoir connected on the one hand with the delivery side of said compressor and on the other hand to said liquid nitrogen injecting means, the delivery side of said second pump being connected with said liquefied gas injecting means in said heat exchanger.

2. In a container vessel arrangement for storage and transportation of liquefied natural and other similar gases in the cooled condition, the combination of a storage vessel for reception therein of a body of said liquefied gases; a heat exchanger vessel having therein liquid nitrogen injecting means for production of supercooled liquefied natural gases; a first pressure pump connected at its suction side with said heat exchanger vessel for drawing said supercooled liquefied natural gases therefrom, a supercooled liquefied natural gas injection means provided in the vicinity of the bottom of said storage vessel to which the pressure side of said first pressure pump is connected; a fractionating chamber in communication with the upper gas space of said storage vessel for condensing gaseous methane entrained in the gaseous nitrogen issuing from the free surface of the liquid body contained in the vessel; a multistage compressor connected with the top of said fractionating chamber for sucking substantially gaseous nitrogen from the fractionating chamber after it is substantially free of natural gases; a piping in said storage vessel arranged below the free surface of the liquid body contained therein and having a plurality of inlet openings arranged in the vicinity of the inside of the wall of said storage vessel; a second pressure pump connected at its suction side with said piping; a liquid nitrogen reservoir connected on the one hand with the delivery side of said compressor and on the other hand to said liquid nitrogen injecting means, and a liquefied gas injecting means in said heat exchanger vessel, the delivery side of said second pump being connected with said liquefied gas injecting means.

3. Container vessel arrangement as claimed in claim 1, wherein said supercooled liquefied natural gas injection means is a horizontal coil tube having a number of injection orifices formed therein and directed upwardly of said storage vessel.

4. Container vessel arrangement as claimed in claim 1, wherein said both injecting means arranged in the heat exchanger vessel are injection coils arranged in close proximity to each other, said coils each having the same number of injection orifices formed therein and the orifices in one coil being substantially opposed to the orifices in the other coil.

5. Container vessel arrangement as claimed in claim 1, wherein said heat exchanger vessel is provided with a plurality of fine screens arranged in vertical stages for further dividing injected liquids.

6. Container vessel arrangement as claimed in claim 1, wherein said heat exchanger vessel is further provided with a substantially horizontal dished screen made of fine alloy steel wires, for separating occasionally developed solid methane from the circulating liquid.

7. Container vessel arrangement as claimed in claim 1, wherein said heat exchanger vessel is further provided with an outlet opening for taking out the gaseous nitrogen developed within the heat exchanger vessel, and a liquid separator in said heat exchanger vessel adjacent said outlet opening.

8. In a container vessel arrangement for storage and transportation of liquefied natural and other similar gases under cooled conditions, the combination of a storage vessel for reception therein of a body of said liquefied gases, a heat exchanger vessel having therein liquid nitrogen injecting means for production of supercooled liquefied natural gases, a first pressure pump connected at its suction side with said heat exchanger vessel for drawing said supercooled liquefied natural gases therefrom, a supercooled liquefied natural gas injection means provided in the vicinity of the bottom of said storage vessel to which the pressure side of said first pressure pump is connected, a fractionating chamber in communication with the upper gas space of said storage vessel for condensing gaseous methane entrained in the gaseous nitrogen issuing from the free surface of the liquid body contained in the vessel, a multistage compressor connected with top of said fractionating chamber for sucking substantially gaseous nitrogen from the fractionating chamber after it is substantially free of natural gases, a piping in said storage vessel arranged below the free surface of the liquid body contained therein and having a plurality of inlet openings arranged in the vicinity of the inside of the wall of said storage vessel, a second pressure pump connected at its suction side with said piping, a liquid nitrogen reservoir connected on the one hand with the delivery side of said compressor and on the other hand to said liquid nitrogen injecting means, and a liquefied gas injecting means in said heat exchanger vessel, the delivery side of said second pump being connected with said liquefied gas injecting means, and the top of said heat exchange vessel being connected to the bottom of said fractionating chamber for delivering nitrogen with a small amount of stored gas therein to the top of said storage vessel and to said fractionating chamber.

9. A method of cooling liquefied methane in the storage and transportation thereof in a tank having walls exposed to ambient thermal influences, which comprises the steps of withdrawing relatively warm liquid methane from the upper part of the methane in the tank, simultaneously injecting the withdrawn relatively warm liquid methane and liquid nitrogen into a heat exchanger and thoroughly admixing them in the heat exchanger for supercooling the methane, withdrawing supercooled methane from the lower part of the heat exchanger and injecting it into the lower part of the liquid methane in the storage tank for causing it to thoroughly admix with the methane in the storage tank for cooling the methane in the storage tank, withdrawing gaseous nitrogen with a small amount of methane therein from the top of the heat exchanger and conducting it to the top of the storage tank above the liquid methane therein, fractionating the mixture of nitrogen and methane from the top of the tank, withdrawing the fractionated nitrogen, compressing and cooling the nitrogen to liquid form, and supplying it for injection to the heat exchanger.

References Cited in the file of this patent

UNITED STATES PATENTS

| | | |
|---|---|---|
| 1,963,922 | Robinson | June 19, 1934 |
| 2,611,511 | Wissmiller | Sept. 23, 1952 |
| 2,783,624 | Morrison | Mar. 5, 1957 |
| 2,959,928 | Maker | Nov. 15, 1960 |
| 2,964,916 | Keeping | Dec. 20, 1960 |
| 2,984,080 | Sliepcevich | May 16, 1961 |